(12) United States Patent
Pluntke et al.

(10) Patent No.: US 9,585,049 B2
(45) Date of Patent: Feb. 28, 2017

(54) METHOD FOR MULTIPATH SCHEDULING BASED ON A LOOKUP TABLE

(75) Inventors: Christopher David Pluntke, Helsinki (FI); Niko Kiukkonen, Veikkola (FI); Lars Eggert, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 160 days.

(21) Appl. No.: 13/979,029

(22) PCT Filed: Jan. 14, 2011

(86) PCT No.: PCT/IB2011/050182
§ 371 (c)(1),
(2), (4) Date: Jul. 10, 2013

(87) PCT Pub. No.: WO2012/095704
PCT Pub. Date: Jul. 19, 2012

(65) Prior Publication Data
US 2013/0279331 A1  Oct. 24, 2013

(51) Int. Cl.
| H04J 3/14 | (2006.01) |
| H04W 28/02 | (2009.01) |
| H04L 12/707 | (2013.01) |
| H04W 40/02 | (2009.01) |
| H04W 72/12 | (2009.01) |

(52) U.S. Cl.
CPC ........ *H04W 28/0231* (2013.01); *H04L 45/24* (2013.01); *H04W 40/02* (2013.01); *H04W 72/12* (2013.01)

(58) Field of Classification Search
CPC . H04W 28/0231; H04W 40/02; H04W 72/12; H04L 45/24
See application file for complete search history.

(56) References Cited

U.S. PATENT DOCUMENTS

| 7,245,913 B1 | 7/2007 | Nguyen et al. |
| 7,254,385 B2 * | 8/2007 | Atkin ...................... H04W 4/14 455/414.1 |
| 7,466,703 B1 * | 12/2008 | Arunachalam et al. ...... 370/392 |
| 7,626,932 B2 * | 12/2009 | Tuulos ................ H04L 12/5695 370/230 |
| 7,710,972 B2 * | 5/2010 | Gurumurthy ................ 370/392 |

(Continued)

OTHER PUBLICATIONS

International Search Report received for corresponding Patent Cooperation Treaty Application No. PCT/IB2011/050182, dated Oct. 18, 2011, 5 pages.

*Primary Examiner* — Phuc Tran
(74) *Attorney, Agent, or Firm* — Mintz Levin Cohn Ferris Glovsky and Popeo, P.C.

(57) ABSTRACT

A method for providing a multipath scheduler may include causing generation of a lookup table of action rules defining actions corresponding to respective different states in which each of the states is a weighted description of performance measures associated with a data interface, and enabling utilization of the lookup table at a predefined periodicity during communication in a multipath communication environment to identify a selected data interface among a plurality of available data interfaces based on current performance measures associated with the plurality of available data interfaces. A corresponding apparatus and computer program product are also provided.

21 Claims, 3 Drawing Sheets

(56) References Cited

U.S. PATENT DOCUMENTS

| | | | |
|---|---|---|---|
| 8,098,578 B1* | 1/2012 | Shah | H04L 45/00 370/230 |
| 8,203,954 B1* | 6/2012 | Patel | H04L 45/00 370/235 |
| 8,565,726 B2* | 10/2013 | Walker | H04L 41/0806 455/411 |
| 8,572,676 B2* | 10/2013 | Sapp | H04L 41/0806 726/1 |
| 8,605,722 B1* | 12/2013 | Sindhu et al. | 370/390 |
| 8,818,283 B2* | 8/2014 | McHenry | H04W 16/14 455/62 |
| 2004/0174853 A1* | 9/2004 | Saito et al. | 370/338 |
| 2005/0174981 A1 | 8/2005 | Heath, Jr. et al. | |
| 2007/0135114 A1 | 6/2007 | Valentino | |
| 2008/0155206 A1* | 6/2008 | Gurumurthy | 711/154 |
| 2010/0002667 A1* | 1/2010 | Lin | H04W 88/06 370/338 |
| 2010/0037088 A1* | 2/2010 | Krivopaltsev | H04L 41/0681 714/4.1 |
| 2012/0054437 A1* | 3/2012 | Huang et al. | 711/118 |
| 2012/0270523 A1* | 10/2012 | Laudermilch | H04W 48/02 455/411 |

* cited by examiner

METHOD FOR MULTIPATH SCHEDULING BASED ON A LOOKUP TABLE

RELATED APPLICATION

This application was originally filed as PCT Application No. PCT/IB2011/050182 filed Jan. 14, 2011.

TECHNOLOGICAL FIELD

An embodiment of the present invention relates generally to wireless communication technology and, more particularly, relates to a method and apparatus for providing a multipath scheduling of data interface usage.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, web browsing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, electronic book or reading device, etc.

In many situations, it may be desirable for the user to interface with a device such as a mobile terminal for the provision of an application or service. A user's experience during certain applications such as, for example, web browsing or navigating through content may be enhanced by the provision of a responsive communication channel that has low latency and is efficient. Thus, it may be desirable to develop mechanisms by which to provide for the selection and management of efficient and well performing network paths through available data interfaces when multiple options are available.

BRIEF SUMMARY

A method, apparatus and computer program product are therefore provided to enable the provision of a multipath scheduler that may be configured to provide adaptive scheduling. In this regard, for example, some embodiments may provide for the use of a lookup table defining actions corresponding to respective different states based on solving an optimization problem.

In one example embodiment, a method of providing a multipath scheduler is provided. The method may include causing generation of a lookup table of action rules defining actions corresponding to respective different states in which each of the states is a weighted description of performance measures associated with a data interface, and enabling utilization of the lookup table repeatedly (e.g., at a predefined or adaptive periodicity) during communication in a multipath communication environment to identify a selected data interface among a plurality of available data interfaces based on current performance measures associated with the plurality of available data interfaces.

In another example embodiment, an apparatus for providing a multipath scheduler is provided. The apparatus may include at least one processor and at least one memory including computer program code. The at least one memory and the computer program code may be configured to, with the at least one processor, cause the apparatus to perform at least causing generation of a lookup table of action rules defining actions corresponding to respective different states in which each of the states is a weighted description of performance measures associated with a data interface, and enabling utilization of the lookup table repeatedly (e.g., at a predefined or adaptive periodicity) during communication in a multipath communication environment to identify a selected data interface among a plurality of available data interfaces based on current performance measures associated with the plurality of available data interfaces.

In one example embodiment, another apparatus for providing a multipath scheduler is provided. The apparatus may include means for causing generation of a lookup table of action rules defining actions corresponding to respective different states in which each of the states is a weighted description of performance measures associated with a data interface, and means for enabling utilization of the lookup table repeatedly (e.g., at a predefined or adaptive periodicity) during communication in a multipath communication environment to identify a selected data interface among a plurality of available data interfaces based on current performance measures associated with the plurality of available data interfaces.

In one example embodiment, a computer program product for providing a multipath scheduler is provided. The computer program product may include at least one computer-readable storage medium having computer-executable program code instructions stored therein. The computer-executable program code instructions may include program code instructions for causing generation of a lookup table of action rules defining actions corresponding to respective different states in which each of the states is a weighted description of performance measures associated with a data interface, and enabling utilization of the lookup table repeatedly (e.g., at a predefined or adaptive periodicity) during communication in a multipath communication environment to identify a selected data interface among a plurality of available data interfaces based on current performance measures associated with the plurality of available data interfaces.

An example embodiment of the invention may provide a method, apparatus and computer program product for employment in mobile environments or in fixed environments. As a result, for example, mobile terminal and other computing device users may enjoy an improved ability to take advantage of a best-suited and most efficient available communication flow path for current conditions.

BRIEF DESCRIPTION OF THE DRAWING(S)

Having thus described some embodiments of the invention in general terms, reference will now be made to the accompanying drawings, which are not necessarily drawn to scale, and wherein:

DETAILED DESCRIPTION

Figure 1:
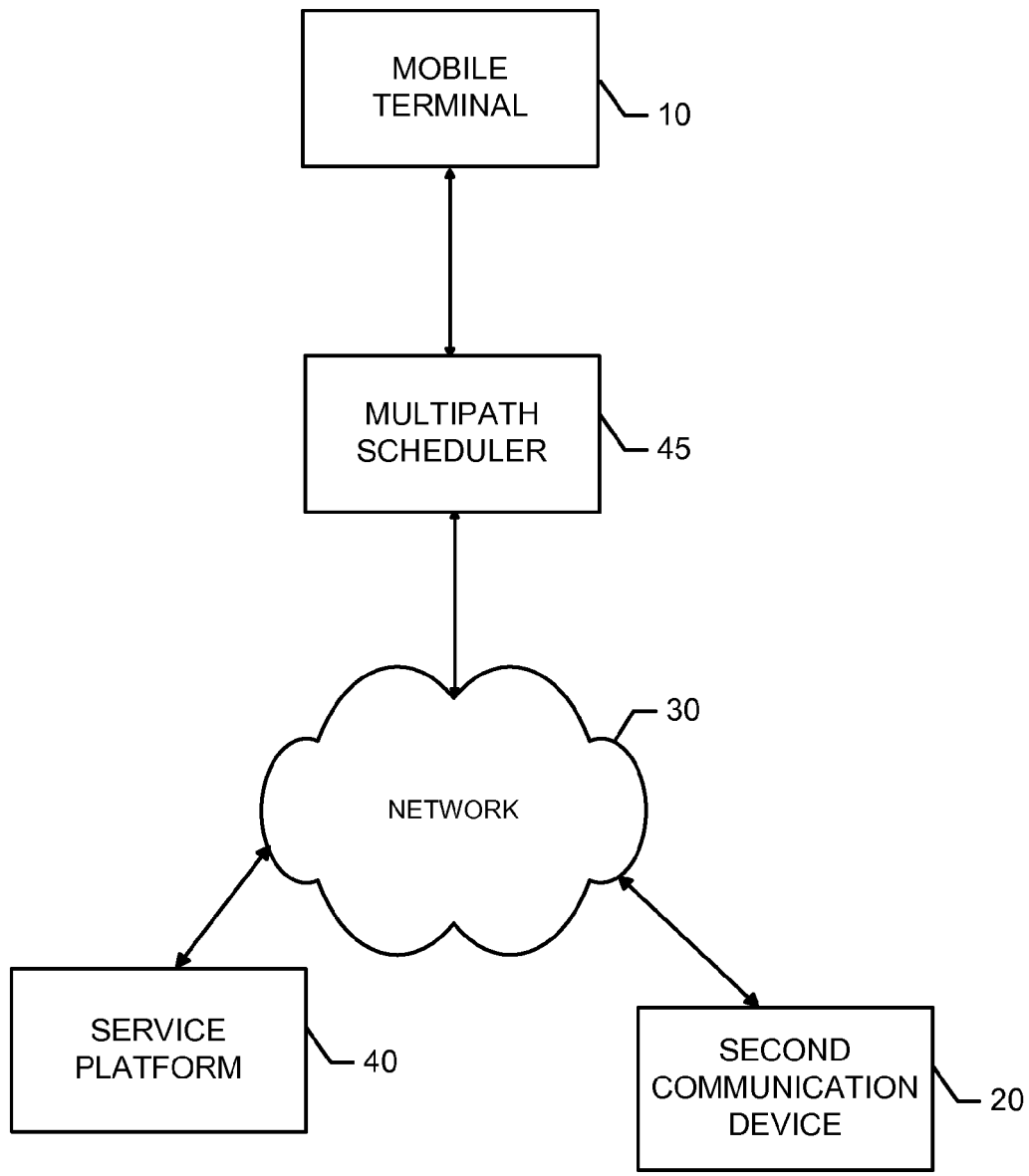
FIG. 1 is a schematic block diagram of a wireless communications system according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Given that it is often desirable for the user of a mobile terminal to utilize the most efficient and low latency data interface that is currently available in light of the limited resources of mobile terminals in terms of both power and processing, it may be preferable to utilize a data interface that provides one or more of a sufficient throughput for the needs of the current communication sessions with a relatively low cost, low power consumption and low latency under the current conditions. To select a data interface or network that is likely to provide the best user experience, one approach may be to examine the performance of each (or at least multiple) different data interface prior to establishing a communication flow and then select the best performing data interface to provide the needed communication flow. This method, however, ignores the fact that conditions may change during the time over which the communication flow may be provided. Thus, the best data interface at one instant in time, may not remain the best data interface over time.

To provide better performance over time, it may be desirable to explore or test other interfaces frequently, even during the provision of current communication flows. Then, for example, if an interface is discovered that better suits the performance needs of the ongoing communication sessions, the communication flow could perhaps be switched over to the better performing interface. However, to explore the performance of other data interfaces also takes resources and exploring inefficient data interfaces necessarily wastes resources since the exploration requires some level of active use. Moreover, even if a best interface is found and exploited, throughput values and power efficiency can change unpredictably at any time on unobserved interfaces, which makes even further exploration phases necessary. This problem, in mathematical terms, is referred to as the restless bandit problem, and it gets more complicated as realistic finite state machines are taken into account for incorporating different startup, timeout and throughput states. Switching interfaces in reality may also be power insensitive in some cases since conservative timeouts on idle interfaces may lead to high power consumption (e.g., on the order of tens of second) after transmission has stopped. Thus, one challenge that arises may be to balance exploration against energy and resource consumption devoted to the exploration to achieve a good balance that provides the greatest benefit overall.

Another challenge is to be able to transfer flows between different interfaces and network paths seamlessly. Without an ability to seamlessly transfer flows between different interfaces and network paths, taking advantage of exploration efforts to determine which data interface can provide an optimal path for current conditions would not be advantageous since timeouts, resets in transmission and broken downloads would waste bandwidth and resources. The transmission control protocol (TCP) is one example of a service that provides ordered delivery of streams of data from one device (or program or application on the device) to another device (or program or application on the device). As such, TCP provides services related to exchanging data directly between devices over a network. Multipath TCP (MPTCP) attempts to utilize multiple paths (e.g., multiple different network or data interfaces) for one TCP connection. Thus, MPTCP may increase redundancy and provide more optimal resource usage by enabling statistical multiplexing of resources to thereby increase TCP throughput. Effective utilization of MPTCP may therefore be advantageous.

As indicated above, some embodiments of the present invention may relate to the provision of a mechanism for providing a multipath scheduler. In this regard, for example, some example embodiments may provide for the employment of a device or mechanism that may provide a scheduler to optimize scheduling of communications over multiple possible communication paths. As such, the multipath scheduler may be configured to support MPTCP or other multipath data stream services (such as SCTP, the Stream Control Transmission Protocol) to balance exploration of different data interfaces and enable seamless transfer of communication flows between different paths to improve or optimize resource usage and performance.

FIG. 1 illustrates a generic system diagram in which a device such as a mobile terminal 10, which may benefit from some embodiments of the present invention, is shown in an example communication environment. As shown in FIG. 1, a system in accordance with an example embodiment of the present invention comprises a first communication device (e.g., mobile terminal 10) and a second communication device 20 that may each be capable of communication with a network 30. The second communication device 20 is provided as an example to illustrate potential multiplicity with respect to instances of other devices that may be included in the network 30 and that may practice an example embodiment. The communications devices of the system may be able to communicate with network devices or with each other via the network 30. In some cases, the network devices with which the communication devices of the system communicate may include a service platform 40. In an example embodiment, the mobile terminal 10 (and/or the second communication device 20) is enabled to communicate with the service platform 40 to provide, request and/or receive information associated with a service.

While an example embodiment of the mobile terminal 10 may be illustrated and hereinafter described for purposes of example, numerous types of mobile terminals, such as portable digital assistants (PDAs), pagers, mobile televisions, mobile telephones, gaming devices, laptop computers, cameras, camera phones, video recorders, audio/video players, radios, electronic books, global positioning system (GPS) devices, navigation devices, or any combination of the aforementioned, and other types of multimedia, voice and text communications systems, may readily employ an example embodiment of the present invention. Furthermore, devices that are not mobile may also readily employ an example embodiment of the present invention in some cases. As such, for example, the second communication device 20 may represent an example of a fixed electronic device that may employ an example embodiment. For example, the second communication device 20 may be a personal computer (PC) or other terminal.

In some embodiments, not all systems that employ embodiments of the present invention may comprise all the devices illustrated and/or described herein. For example, while an example embodiment will be described herein in which either a mobile user device (e.g., mobile terminal 10), a fixed user device (e.g., second communication device 20), or a network device (e.g., the service platform 40) may include an apparatus capable of performing some example embodiments in connection with communication with the network 30, it should be appreciated that some embodiments may exclude one or multiple ones of the devices or the network 30 altogether and simply be practiced on a single device (e.g., the mobile terminal 10 or the second communication device 20) in a stand alone mode.

In an example embodiment, the network 30 comprises a collection of various different nodes, devices or functions that are capable of communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like.

One or more communication terminals such as the mobile terminal 10 and the second communication device 20 may be capable of communication with each other via the network 30 and each may include an antenna or antennas for transmitting signals to and for receiving signals from a base site, which could be, for example a base station that is a part of one or more cellular or mobile networks or an access point that may be coupled to a data network, such as a local area network (LAN), a wireless LAN (WLAN), a metropolitan area network (MAN), and/or a wide area network (WAN), such as the Internet. Each of these may be examples of data interfaces supported by the network 30. In turn, other devices such as processing devices or elements (e.g., personal computers, server computers or the like) may be coupled to the mobile terminal 10 and the second communication device 20 via the network 30. By directly or indirectly connecting the mobile terminal 10, the second communication device 20 and other devices to the network 30, the mobile terminal 10 and the second communication device 20 may be enabled to communicate with the other devices (or each other), for example, according to numerous communication protocols, to thereby carry out various communication or other functions of the mobile terminal 10 and the second communication device 20, respectively.

Furthermore, although not shown in FIG. 1, the mobile terminal 10 and the second communication device 20 may communicate in accordance with, for example, radio frequency (RF), Bluetooth (BT), Infrared (IR) or any of a number of different wireline or wireless communication techniques, including universal serial bus (USB), LAN, wireless LAN (WLAN), Worldwide Interoperability for Microwave Access (WiMAX), WiFi, ultra-wide band (UWB), Wibree techniques and/or the like, which may be supported by the network 30. As such, the mobile terminal 10 and the second communication device 20 may be enabled to communicate with the network 30 and each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In an example embodiment, the service platform 40 may be a device or node such as a server or other processing device. The service platform 40 may have any number of functions or associations with various services. As such, for example, the service platform 40 may be a platform such as a dedicated server (or server bank) associated with a particular information source or service, or the service platform 40 may be a backend server associated with one or more other functions or services. As such, the service platform 40 represents a potential host for a plurality of different services or information sources. In some embodiments, the functionality of the service platform 40 is provided by hardware and/or software components configured to operate in accordance with known techniques for the provision of information to users of communication devices. However, at least some of the functionality provided by the service platform 40 may be information provided in accordance with an example embodiment of the present invention.

In some embodiments, the mobile terminal 10 (or the second communication device 20) may communicate information (e.g., via the network 30) with each other or with the service platform 40. However, since the network 30 may represent multiple potential communication flow paths via various available data interfaces (e.g., 3G, LTE, WLAN, etc.), an example embodiment may provide a multipath scheduler 45 to control exploration of each available data interface and utilization of a selected data interface based on the exploration activities (e.g., selecting an optimal data interface based on current conditions). In some examples, the multipath scheduler 45 may exist at the edge of the network 30 to select an optimal set of interfaces for MPTCP traffic. However, in other embodiments, the multipath scheduler 45 may exist in the mobile terminal 10 (and/or the second communication device 20). In still other embodiments, portions of the multipath scheduler 45 may exist at, or certain functionalities associated with the multipath scheduler 45 may be performed by both a proxy device at the edge of the network 30 and by the mobile terminal 10 (and/or the second communication device 20).

Figure 2:
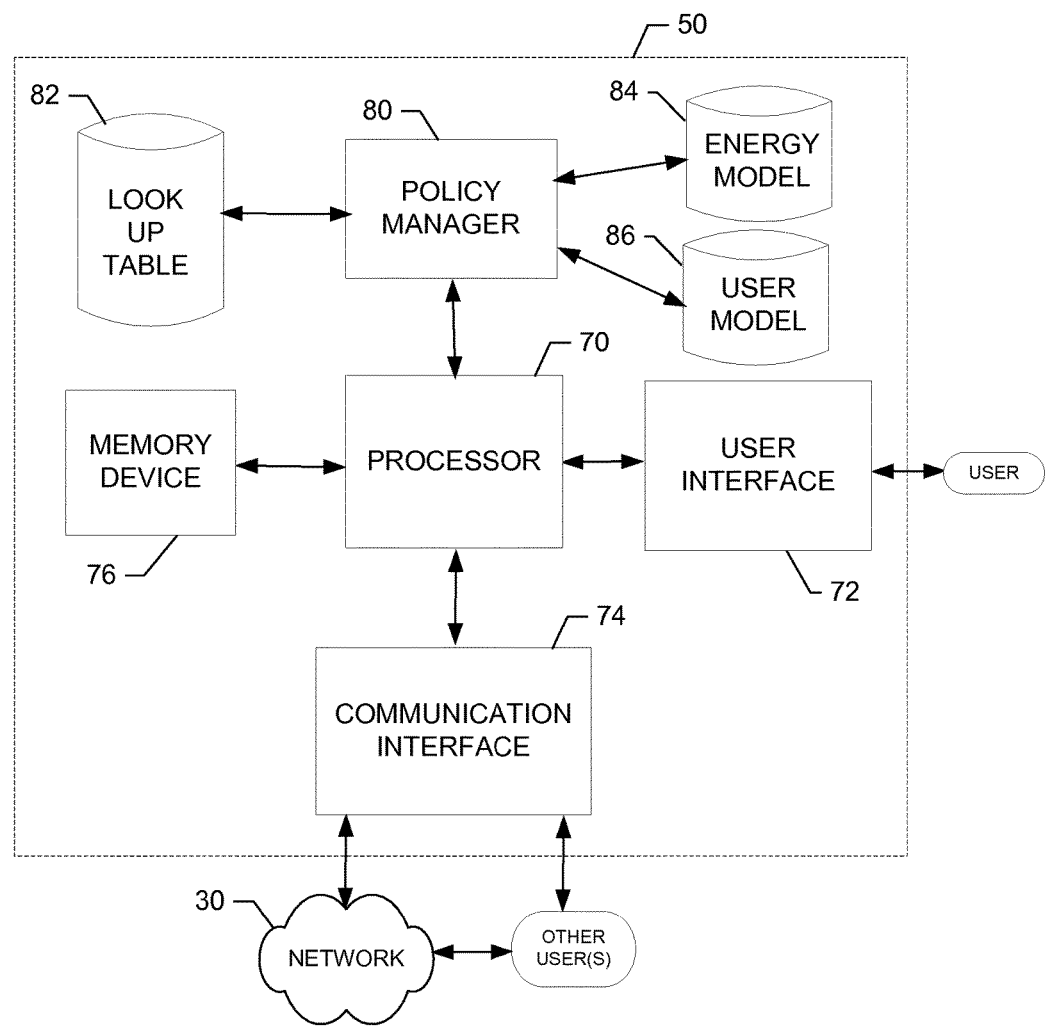
FIG. 2 illustrates a block diagram of an apparatus for providing a multipath scheduler according to an example embodiment of the present invention.

FIG. 2 illustrates a schematic block diagram of an apparatus for providing a multipath scheduler according to an example embodiment of the present invention. An example embodiment of the invention will now be described with reference to FIG. 2, in which certain elements of an apparatus 50 for providing a multipath scheduler are displayed. In some cases, the apparatus 50 of FIG. 2 may be employed, for example, on the multipath scheduler 45. However, in some cases, an embodiment may be employed on a combination of devices in a distributed fashion. Accordingly, some embodiments of the present invention may be embodied wholly at a single device (e.g., the mobile terminal 10 or an MPTCP proxy server at the network edge) or by a plurality of devices in a distributed fashion (e.g., the mobile terminal 10 and the MPTCP proxy server at the network edge). Furthermore, it should be noted that the devices or elements described below may not be mandatory and thus some may be omitted in certain embodiments.

Referring now to FIG. 2, an apparatus for providing a multipath scheduler is provided. The apparatus 50 may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be the multipath scheduler 45, a proxy device (e.g., an MPTCP proxy), the mobile terminal 10 or other computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied in hardware as one or more of various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), central processing unit (CPU), a hardware accelerator, a vector processor, a graphics processing unit (GPU), a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a multipath scheduler) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

The user interface 72 (if employed) may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a communication device (e.g., the mobile terminal 10 or the second communication device 20), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

Meanwhile, the communication interface 74 may be any means such as a device or circuitry embodied in either hardware, or a combination of hardware and software, that is configured to receive and/or transmit data from/to a network and/or any other device or module in communication with the apparatus. In this regard, the communication interface 74 may include, for example, an antenna (or multiple antennas) and supporting hardware and/or software for enabling communications with one or more wireless communication networks. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

In an exemplary embodiment, the processor 70 may be embodied as, include or otherwise control a policy manager 80, which may employ a Markov decision process in some embodiments. As such, in some embodiments, the processor 70 may be said to cause, direct or control the execution or occurrence of the various functions attributed to the policy manager 80 as described herein. The policy manager 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the policy manager 80 as described herein. Thus, in examples in which software is employed, a device or circuitry (e.g., the processor 70 in one example) executing the software forms the structure associated with such means.

In an example embodiment, the policy manager 80 may be configured to access (or measure) connection information and context information in order to generate multipath flow utilization policies based on the connection information and context information. In an example embodiment, a lookup table 82 may be provided for use by the policy manager 80 in connection with mapping measured state variables to corresponding scheduling actions relating to which available data interfaces to use and which data interfaces to leave idle. In practice, the multipath scheduler 45 may give scheduling actions to a kernel that informs an MPTCP module which interfaces to prefer for transmission based on the output of the policy manager 80. All MPTCP flows may then be informed about scheduling policy decisions thereafter, and flows may be provisioned accordingly.

In an example embodiment, the policy manager 80 may monitor or otherwise receive information indicative of idle and active data interfaces. Thus, for example, if a data interface switches from idle to active, a new subflow may be established via the corresponding data interface using a standard handshake (e.g., a SYN, SYN/ACK, ACK three-way handshake) and an indication may be provided as to of which connection the data interface will be a part (e.g., via a JOIN option). Meanwhile, for a transition of a data interface from active status to idle status, the corresponding subflow may be closed (e.g., via a FIN, FIN/ACK exchange) via a remove address option in a header field. In some cases, an explicit instruction to use a subflow or not use a subflow may be defined in a protocol for use with example embodiments.

The lookup table 82 may take any form capable of providing storage for states and corresponding actions that can be accessed by the processor 70 for use as described herein. Thus, the lookup table 82 need not be limited to any particular format or structure. In an example embodiment, the lookup table 82 may be generated to reduce (or minimize where possible) certain characteristics such as energy or resource consumption and cost, and to increase (or maximize where possible) characteristics such as throughput and reliability over time for stochastic user behavior. In some cases, the problem of determining a balance among these characteristics may be defined as a Markov decision process (MDP). MDP theory provides tools to efficiently solve for a set of optimal scheduling rules or policies in the form of the lookup table 82. The scheduling rules (or in the language of MDPs: state→action rules) may be determined in some examples by running a Value Iteration algorithm. Moreover, in some cases, the lookup table 82 and/or other operations of the policy manager 80 may be influenced by information recorded in an energy model 84 (storing information associated with device energy consumption based on device state) and/or a user model 86 (storing information associated with user input, user preferences, and/or user activities).

In some examples, MDPs include a state space and actions in the state space as well as rewards earned in each state. Thus, an MDP can be tailored to a specific problem by defining a concrete state and action space as well as the objective function for the specific problem. The state of a mobile device may include values for:

l(i): the last scheduling decision taken (interface up=1, interface down=0) for interface l;

t(i,j,k): mean throughput-information for interface i over a j second measurement ending k seconds ago (from the user model 86); and e(i): the energy state of interface i (from the energy model 84).

Additional optional state values may include but are not limited to:

app: The active application or desired data object, etc.;

f(i): channel state of interface i (e.g. signal strength);

d(i,j,k): average delay experienced on interface i over a j second measurement ending k seconds ago;

a(i): access point or base station which interface i is connected to at the moment; and t: date and time of day.

A state s may be written as an n-tuple. For example, in a case where the mobile terminal 10 employs a GPRS modem and a WiFi interface using state information about the last scheduling rule, mean throughput in the last second, the current access point and the next requested website, the state space of the device may be described by the 8-tuple: (l(1), l(2), t(1,1,0), t(2,1,0), e(1), e(2), a(1), a(2),app). An example state could be (1,0,300 kbps, 0 kbps, transmitting, FACH_timout_6s, "BaseStation-951", "WiFi-Hotspot", YouTube). Sensitive state information such as access point names can also be made anonymous by using hashed values such as MD5 hashes.

An action or a scheduling rule for a scheduler with k accessible interfaces may be defined as a k tuple \in{0,1}^k, specifying which interfaces to use (1) or to let idle (0) until the next scheduling decision is made. In some embodiments, the policy manager 80 may be configured to make scheduling decisions at predefined intervals or in response to predefined events. Thus, for example, scheduling decisions may be made in fixed time intervals or every time an event occurs (e.g. every time the website is changed since different websites may have different throughput characteristics on average leading to different optimal interfaces in terms of energy consumption for each respective website), or adaptively at other times as determined by the scheduler.

In an example embodiment, the transition probabilities between different states under a given action (e.g., probability((state0, action0 at time t_i) leads to (state1 at time t_i+1)) may be known or determined based on experience, since these probabilities can be generated by direct measurements or by fitting a distribution to measured values. Between each scheduling decision, a feedback or so-called "reward" consisting of a weighted trade-off between negative energy consumption, throughput, negative delay, negative cost and negative disconnection penalty may be earned. Hence, the optimization problem to be solved may be to maximize the total, discounted reward over time:

maximize Expected_Value[\sum\limits_{time t=0}^{\infty} \gamma^t Reward(state at time t)|given a start state s_0] over all scheduling rules of the form (state)→(action) \gamma \in [0,1[is a so-called discount variable that regulates over which time scales to optimize. The time horizon taken into account by the policy manager 80 may extend to infinity as gamma→1. For the optimization of average reward, gamma may be chosen as a value close to 1.

In some embodiments, the optimization problem may be solved offline using techniques from optimal control theory, such as the Value Iteration algorithm. The solution may yield the lookup table 82 defining optimal decision rules of the form (state)→(action). The lookup table 82 of scheduling rules may then be loaded onto the mobile terminal 10, which may use the lookup table 82 to monitor the state of its interfaces and use the scheduling rules suggested in the file to select an interface based on the current conditions as applied to the scheduling rules in the lookup table 82. As such, in some embodiments, the multipath scheduler 45 may be a network device that determines the lookup table 82, which is provided to the mobile terminal 10. However, in other embodiments, the multipath scheduler 45 may be embodied at the mobile terminal 10 and build the lookup table 82 on the mobile terminal 10 itself for application while online.

In some alternative embodiments, approximate heuristic solutions may be generated by, for example, only considering some of the next steps of the process and not the entire future of the process. This may simplify the multipath scheduler 45 to some degree and enable quicker generation of the lookup table 82 for or by the mobile terminal 10. As an example, if the previous application used was an application that typically involves streaming content and the user is a heavy online streaming user, and the next application is a search engine which would typically be expected to be used in short bursts by comparison to the previous application, switching the data interface to support the next application may not be desirable. In this regard, since the next session is likely to be short in comparison to the previous session (and any subsequent session), enduring a timeout associated with conducting the switch may not be desirable. The entire history of the user may not be needed to make this decision.

In an example embodiment, the lookup table 82 may be constructed to define actions for respective different states using weighted values that modify respective different states. Thus, for certain states that are more heavily weighted, the corresponding actions associated with those states will be more likely to be directed by the lookup table 82. In some cases, the weights may come from the energy model 84 and the user model 86. These weights may be static or selectable.

In the case of static weights in the user model 86, the weight values may be determined offline based on either an average user or another user having desirable traits with respect to one characteristic or another. Similarly, static weights in the energy model 84 may be associated with average energy consumption expectations for given devices.

For selectable weights in the user model 86, the weights may be modified based on a particular user's behavior or based on input data from a particular user. Thus, for example, user data may be collected in order to modify input user data for the optimization problem described above so that when the lookup table 82 is derived, the lookup table 82 is essentially tailored to the specific user for which the data was collected. It may also be possible to utilize selectable weights for the energy model 84 in situations in which different networks wish to provide different weights to corresponding different energy states of devices.

Accordingly, some example embodiments may apply user selectable weights (or weights selected based on user behavior) to perform adaptive scheduling. As such, the lookup table 82 may be adaptable to specific users rather than simply being generated for an average user or other predefined user types. The optimization problem described above may be solved using the selectably weighted values that may, in some cases, be gathered during usage of the mobile terminal 10. The optimization may be performed online or offline, locally or remotely (e.g., via the service platform 40). Performance measures may be taken for such values as energy, throughput, delay and resilience.

In some cases, different lookup tables 82 may be generated and uploaded for corresponding different combinations of weights. Thus, for example, different lookup tables 82 may be provided for different state→action rules. Although the optimization problem described above is not changed, having different weighted values may provide corresponding different lookup tables for each set of weighted values. As such, there may be essentially different schedulers defined for each different possible combination of weights. The different combinations of weights may be pre-calculated and loaded onto the mobile terminal 10 for usage.

In an example embodiment, the user may be given the option to monitor usage patterns that correspond to the state variables used in the optimization problem (e.g., used applications, throughput information, etc.). Thus, users may upload usage data indicative of the usage patterns of the user and then download personalized lookup tables generated based on the uploaded usage data to correspond to the user's own usage patterns (e.g., from the service platform 40) to have a more personally tailored multipath scheduler performance characteristic. Alternatively, the user may have the service platform 40 assist in scheduler training or guide training on the mobile terminal 10 itself. In some cases, it may be advantageous to schedule training activities and loading of usage patterns during periods when the mobile terminal 10 is connected to mains power and is in an idle mode. User data may be blended with average user behavior data or, if there is enough user data, the user data may be used without contribution from average user behavior data.

Some example embodiments may therefore enable features of all data interfaces to be simultaneously combined for selective employment based on jointly optimizing features such as throughput, delay, energy, resilience, cost, and/or the like. Moreover, some embodiments may be implemented without needing changes to existing applications or infrastructure. Some embodiments may also enable the scheduler to be adapted to specific users to avoid application to only an average user's behavior so that the user may benefit from a more personalized scheduler optimizing for his specific communication habits. Example embodiments may provide for scheduling with respect to uplink and/or downlink data controlled by a mobile device alone. Thus, for example, for scheduling on the uplink, the mobile device may simply select to send packets over the best interface under the current circumstances.

Figure 3:
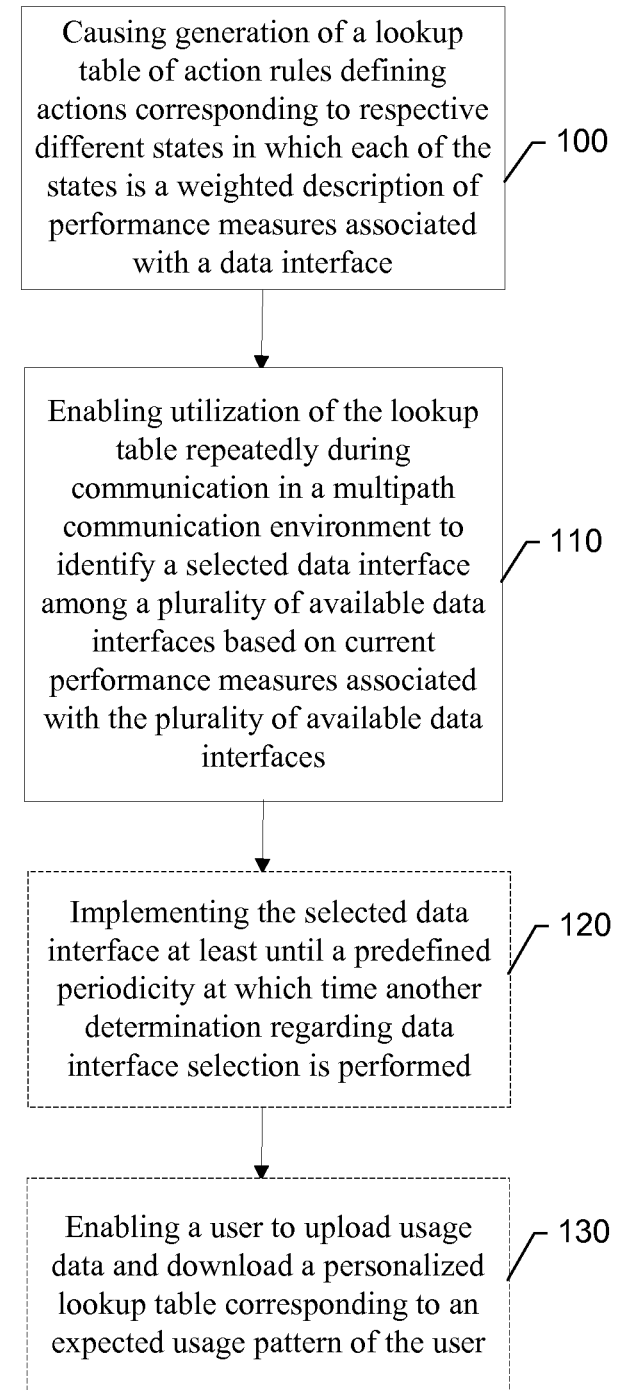
FIG. 3 is a flowchart according to an example method for providing a multipath scheduler according to an example embodiment of the present invention.

FIG. 3 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal or network device and executed by a processor in the user terminal or network device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 3, may include causing generation of a lookup table of action rules defining actions corresponding to respective different states in which each of the states is a weighted description of performance measures associated with a data interface at operation 100, and enabling utilization of the lookup table repeatedly (e.g., at a predefined or adaptive periodicity) during communication in a multipath communication environment to identify a selected data interface from among a plurality of available data interfaces based on current performance measures associated with the plurality of available data interfaces at operation 110.

In some embodiments, certain ones of the operations above may be modified or further amplified as described below. Moreover, in some embodiments additional optional operations may also be included (some examples of which are shown in dashed lines in FIG. 3). It should be appreciated that each of the modifications, optional additions or amplifications below may be included with the operations above either alone or in combination with any others among the features described herein. In some embodiments, the method may further include implementing the selected data interface at least until the predefined or adaptive periodicity at which time another determination regarding data interface selection is performed at operation 120, and/or enabling a user to upload personal usage data and download a personalized lookup table corresponding to the user's usage pattern at operation 130. In an example embodiment, causing generation of the lookup table may include causing generation of the lookup table at a network device for delivery to a mobile terminal or causing generation of the lookup table at a mobile terminal for use at the mobile terminal. In some cases, causing generation of the lookup table may include generating the lookup table based on a user selectable weight for at least one of the performance measures. In an example embodiment, causing generation of the lookup table may include generating multiple lookup tables with corresponding different combinations of weights. In some of the various different embodiments, the lookup table may be generated online or offline.

In an example embodiment, an apparatus for performing the method of FIG. 3 above may comprise a processor (e.g., the processor 70) configured to perform some or each of the operations (100-130) described above. The processor may, for example, be configured to perform the operations (100-130) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-130 may comprise, for example, the policy manager 80. Additionally or alternatively, at least by virtue of the fact that the processor 70 may be configured to control or even be embodied as the policy manager 80, the processor 70 and/or a device or circuitry for executing instructions or executing an algorithm for processing information as described above may also form example means for performing operations 100-130.

In some cases, the operations (100-130) described above, along with any of the modifications may be implemented in a method that involves facilitating access to at least one interface to allow access to at least one service via at least one network. In such cases, the at least one service may be said to perform at least operations 100 to 130.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
causing generation of a lookup table of action rules, wherein the action rules define actions corresponding to different states of a plurality of data interfaces, and wherein each of the different states are weighted descriptions of performance measures associated with a respective data interface from the plurality of data interfaces;
enabling utilization of the lookup table, during communication in a multipath communication environment, for identification of a first data interface from among the plurality of data interfaces, the identification based on current performance measures of the plurality of data interfaces, wherein the current performance measures serve as an input to the weighted descriptions of performance measures; and
implementing the first data interface until a first time at which a determination regarding selection of another data interface from the plurality of data interfaces is performed, the first time based on a predefined periodicity or an adaptive periodicity.

2. The method of claim 1, wherein causing generation of the lookup table further comprises causing generation of the lookup table at a network device for delivery to at least one mobile terminal.

3. The method of claim 1, wherein causing generation of the lookup table further comprises causing generation of the lookup table at a mobile terminal for use at the mobile terminal.

4. The method of claim 1, wherein causing generation of the lookup table further comprises generating the lookup table based on a user selectable weight for at least one of the performance measures.

5. The method of claim 1, wherein causing generation of the lookup table further comprises generating multiple lookup tables with corresponding different combinations of weights.

6. The method of claim 1, wherein causing generation of the lookup table further comprises generating the lookup table online or offline.

7. The method of claim 1, further comprising enabling a user to upload usage data and download a personalized lookup table generated based on the usage data of the user.

8. The method of claim 1, wherein causing generation of the lookup table further comprises causing generation of the lookup table based on average user data or user personalized data.

9. An apparatus comprising at least one processor and at least one memory including computer program code, the at least one memory and the computer program code, executed by the at least one processor, cause the apparatus at least to:
cause generation of a lookup table of action rules, wherein the action rules define actions corresponding to different states of a plurality of data interfaces, and wherein each of the different states are weighted descriptions of performance measures associated with a respective data interface from the plurality of data interfaces;
enable utilization of the lookup table, during communication in a multipath communication environment, for identification of a first data interface from among the plurality of data interfaces, the identification based on current performance measures of the plurality of data interfaces, wherein the current performance measures serve as an input to the weighted descriptions of performance measures; and
implement the first data interface until a first time at which a determination regarding selection of another data interface from the plurality of data interfaces is performed, the first time based on a predefined periodicity or an adaptive periodicity.

10. The apparatus of claim 9, wherein the at least one memory and computer program code are further configured to, with the at least one processor, cause the apparatus to at least generate the lookup table at a network device for delivery to at least one mobile terminal.

11. The apparatus of claim 9, wherein the at least one memory and computer program code are further configured to, with the at least one processor, cause the apparatus to at least generate the lookup table at a mobile terminal for use at the mobile terminal.

12. The apparatus of claim 9, wherein the at least one memory and computer program code are further configured to, with the at least one processor, cause the apparatus to at least generate the lookup table based on a user selectable weight for at least one of the performance measures.

13. The apparatus of claim 9, wherein the at least one memory and computer program code are further configured to, with the at least one processor, cause the apparatus to at least generate multiple lookup tables with corresponding different combinations of weights.

14. The apparatus of claim 9, wherein the at least one memory and computer program code are further configured to, with the at least one processor, cause the apparatus to at least generate the lookup table online or offline.

15. The apparatus of claim 9, wherein the at least one memory and computer program code are further configured to, with the at least one processor, cause the apparatus to at least enable a user to upload usage data and download a personalized lookup table generated based on the usage data of the user.

16. The apparatus of claim 9, wherein the at least one memory and computer program code are further configured to, with the at least one processor, cause the apparatus to at least cause generation of the lookup table by causing generation of the lookup table based on average user data or user personalized data.

17. The apparatus of claim 9, wherein the apparatus is a mobile terminal and further comprises user interface circuitry configured to facilitate user control of at least some functions of the mobile terminal.

18. A non-transitory computer-readable storage medium including computer program code, which when executed by at least one processor causes operations comprising:
causing generation of a lookup table of action rules, wherein the action rules define actions corresponding to different states of a plurality of data interfaces, and wherein each of the different states are weighted descriptions of performance measures associated with a respective data interface from the plurality of data interfaces;

enabling utilization of the lookup table, during communication in a multipath communication environment, for identification of a first data interface from among the plurality of data interfaces, the identification based on current performance measures of the plurality of data interfaces, wherein the current performance measures serve as an input to the weighted descriptions of performance measures; and implementing the first data interface until a first time at which a determination regarding selection of another data interface from the plurality of data interfaces is performed, the first time based on a predefined periodicity or an adaptive periodicity.

19. A method comprising:

generating a lookup table to enable scheduling a plurality of data interfaces, wherein the lookup table includes action rules for scheduling the plurality of data interfaces mapped to states of the plurality of data interfaces, wherein each state is a weighted description of a performance measure associated with a data interface;

utilizing the lookup table during active communication in a multipath flow-based communication to identify a first data interface from among the plurality of data interfaces, the first data interface identified from the lookup table based on current performance measures associated with the plurality of data interfaces and the mapped states in the lookup table; and implementing the first data interface until a first time at which a determination regarding selection of another data interface from the plurality of data interfaces is performed, the first time based on a predefined periodicity or an adaptive periodicity.

20. The method of claim 19, wherein the performance measure comprises a throughput of the data interface and/or a delay of the data interface.

21. The method of claim 19, wherein the multipath flow-based communication is in accordance with a multipath transport control protocol.

* * * * *